US010275150B2

United States Patent
Nabeshima (10) Patent No.: US 10,275,150 B2
(45) Date of Patent: Apr. 30, 2019

(54) DISPLAY CONTROL APPARATUS AND METHOD OF CONTROLLING THE SAME

(71) Applicant: CANON KABUSHIKI KAISHA, Tokyo (JP)

(72) Inventor: Rui Nabeshima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 159 days.

(21) Appl. No.: 15/592,960

(22) Filed: May 11, 2017

(65) Prior Publication Data

US 2017/0329512 A1     Nov. 16, 2017

(30) Foreign Application Priority Data

May 12, 2016 (JP) ................................ 2016-096256

(51) Int. Cl.
| | | |
|---|---|---|
| G06F 3/048 | (2013.01) | |
| G06F 3/0488 | (2013.01) | |
| H04N 5/445 | (2011.01) | |
| G06F 3/0482 | (2013.01) | |
| G06F 3/0485 | (2013.01) | |

(52) U.S. Cl.
CPC ........ *G06F 3/04883* (2013.01); *G06F 3/0482* (2013.01); *H04N 5/44504* (2013.01); *G06F 3/04855* (2013.01); *G06F 2203/04804* (2013.01); *G06F 2203/04806* (2013.01);
(Continued)

(58) Field of Classification Search
CPC .............................. G06F 3/04883; G06F 3/013
See application file for complete search history.

(56) References Cited

U.S. PATENT DOCUMENTS

2010/0045570 A1*  2/2010  Takata ................. G06F 3/0481
                                                                  345/4
2013/0194215 A1*  8/2013  Toida ..................... G06F 3/041
                                                                  345/173
(Continued)

FOREIGN PATENT DOCUMENTS

JP     2010-122856 A     6/2010
JP     2012-14519 A      1/2012

OTHER PUBLICATIONS

A Multi-Scale, Multi-Layer, Translucent Virtual Space, Henry Liberman, 1997.*

*Primary Examiner* — William L Bashore
*Assistant Examiner* — Rayeez R Chowdhury
(74) *Attorney, Agent, or Firm* — Canon U.S.A., Inc. IP Division (57) ABSTRACT

A display control apparatus includes: an accepting unit configured to accept a predetermined operation from a user; a switching unit configured to switch between a first screen on which a display item is displayed in a first layout, and a second screen which includes at least one display item displayed with a first size on the first screen and on which the display item is displayed with a second size and in a second layout; and a display control unit configured to perform control such that, during the predetermined operation for switching from the first screen to the second screen, the first screen and the second screen are displayed while being superimposed without continuously changing the size of the display item in accordance with the predetermined operation, and upon completion of the predetermined operation, the second screen is displayed without the first screen and the second screen being superimposed.

20 Claims, 6 Drawing Sheets

(52) U.S. Cl.
CPC .............. *G06F 2203/04808* (2013.01); *H04N 5/44591* (2013.01)

(56) References Cited

U.S. PATENT DOCUMENTS

2014/0298247 A1* 10/2014 Cho ...................... G06F 3/0488
715/781
2018/0232139 A1* 8/2018 Okuda .................. G06F 3/0488

* cited by examiner

DISPLAY CONTROL APPARATUS AND METHOD OF CONTROLLING THE SAME

BACKGROUND

Field of the Disclosure

The present disclosure relates to a display control apparatus and a method of controlling the same, and particularly to a technique for changing a display format of a predetermined display target in a plurality of stages.

Description of the Related Art

In performing multi-playback in which multiple images are simultaneously displayed on a display unit, an operation for switching the number of images to be displayed may be performed. Japanese Patent. Laid-Open No. 2012-14519 discloses switching the number of images at the time of multi-playback with a zoom lever. There is also known a technique for enlarging or reducing a display target according to an operation amount. Japanese Patent Laid-Open No. 2010-122856 discloses enlarging or reducing an image according to an operation amount of a pinch operation, which is a touch operation.

If switching of the number of displayed images at the time of multi-playback as described in Japanese Patent Laid-Open No. 2012-14519 is performed according to the operation amount of, for example, the pinch operation as described in Japanese Patent Laid-Open No. 2010-122856, a user is not able to recognize that the operation has been entered until the number of displayed images actually changes after the pinch operation has started. At this time, if the display is set to be switched in response to the operation of a predetermined amount or more, the display is suddenly switched after the predetermined amount of operation is performed. In this case, the user may not be able to quickly recognize a change in the layout and size of the image that the user has been viewing, leading to the confusion of the user. Furthermore, if the size of the image included in the multi-playback is changed in response to the pinch operation as in the enlargement/reduction operation described in Japanese Patent Laid-Open No. 2010-122856, it is difficult to determine whether the number of displayed images has been switched or the size of a part of the images has changed.

SUMMARY

In view of the above-described problems, an object of the present disclosure is to improve the operability in switching screens in response to an operation of a predetermined operation amount or more.

A display control apparatus includes: an accepting unit configured to accept a predetermined operation from a user; a switching unit configured to switch between a first screen on which a display item is displayed in a first layout, and a second screen which includes at least one display item displayed with a first size on the first screen and on which the display item is displayed with a second size different from the first size and the display item is displayed in a second layout; and a display control unit configured to perform control such that, during the predetermined operation for switching from the first screen to the second screen by the switching unit, the first screen and the second screen are displayed while being superimposed without continuously changing the size of the display item in accordance with the predetermined operation, and upon completion of the predetermined operation, the second screen is displayed without the first screen and the second screen being superimposed.

Further features of the present disclosure will become apparent from the following description of exemplary embodiments (with reference to the attached drawings).

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

First Embodiment

Preferred embodiments of the present disclosure will be described below with reference to the drawings.

Figure 1:
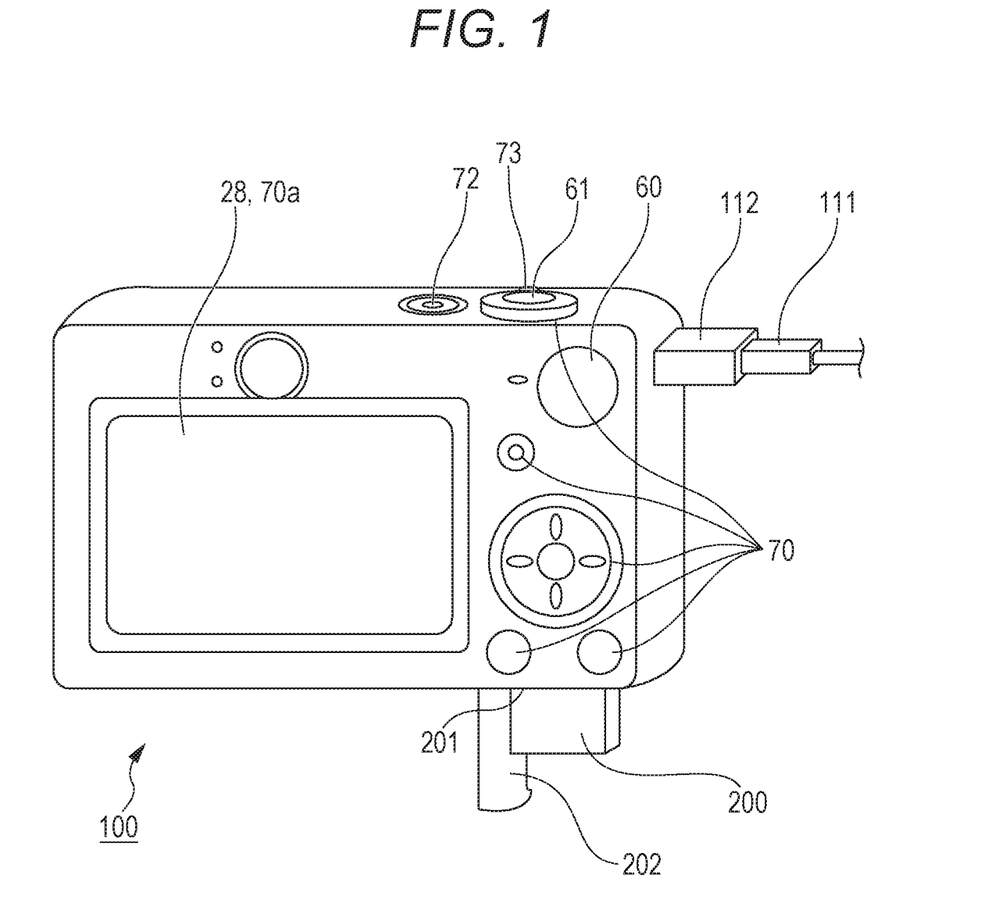
FIG. 1 is an external view of a digital camera as an exemplary apparatus to which the configuration according to one or more aspects of the present disclosure can be applied.
Figure 2:
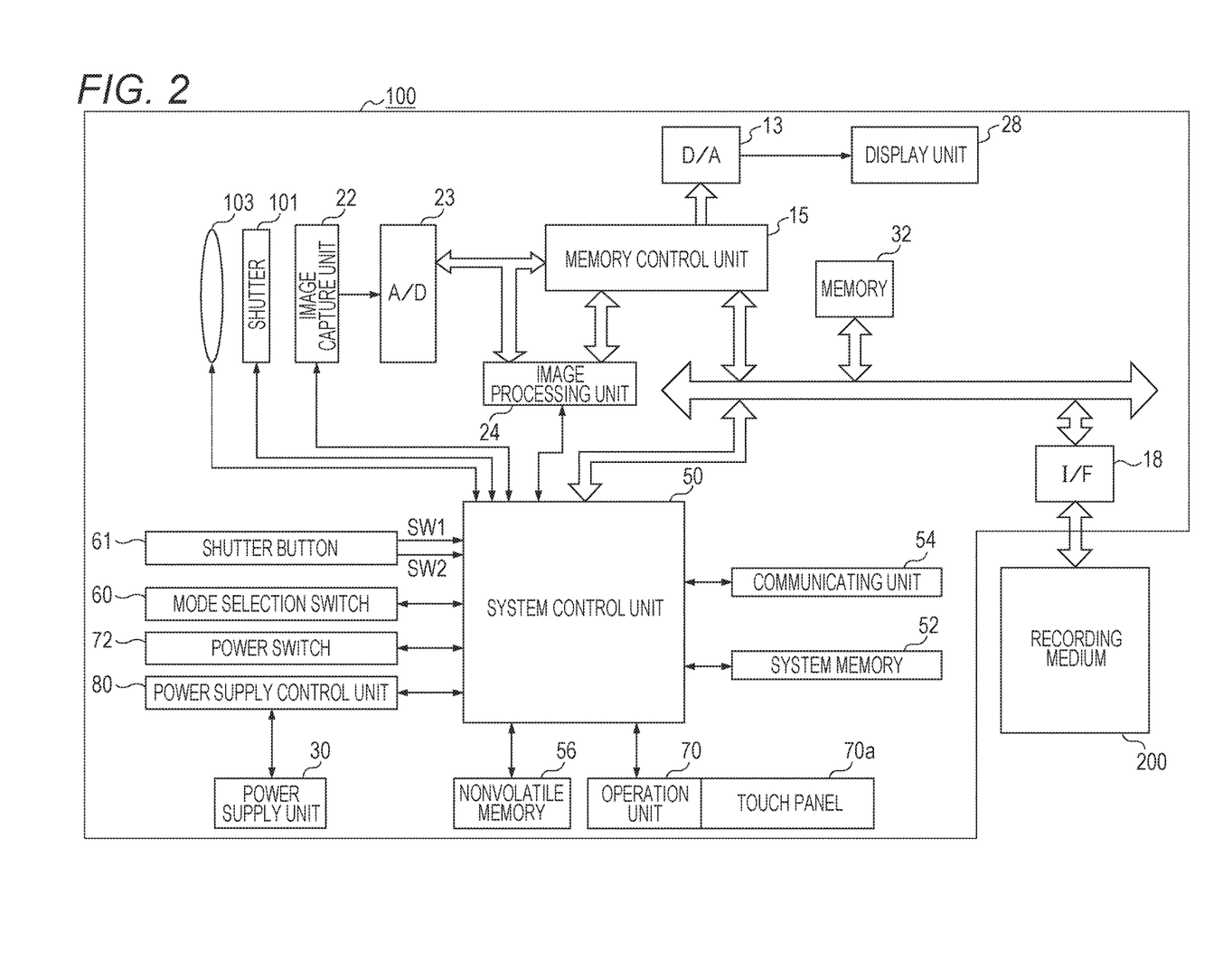
FIG. 2 is a block diagram showing an exemplary configuration of the digital camera as an exemplary apparatus to which the configuration according to one or more aspects of the present disclosure can be applied.

FIG. 1 is an external view of a digital camera 100 as an example of a display control apparatus of the present disclosure. FIG. 2 is a block diagram showing an exemplary configuration of the digital camera 100 as an example of the display control apparatus of the present disclosure.

FIG. 1 is the external view of the digital camera 100 as an example of the display control apparatus of the present disclosure. A display unit 28 displays images and various kinds of information. A touch panel 70a is overlaid on the display unit 28 and accepts a touch operation. A shutter button 61 is an operation unit for issuing a photographing instruction (receiving the photographing instruction in a first stage and performing photographing in a second stage, when depressed). A lever 73 is an operation member provided so as to surround the shutter button 61 and operated by rotating a knob in the left or right direction. For example, an image is enlarged when the knob of the lever 73 is operated in the right direction, while the image is reduced when the knob is operated in the left direction. A mode selection switch 60 is an operation unit for switching various modes. A connector 112 is for connecting a connection cable 111 to the digital camera 100. The connection cable 111 is for connecting to a PC or a printer, for example. An operation unit 70 includes operation members such as various switches, buttons, and a touch panel for accepting various operations from the user. A power switch 72 is a push button for switching between power-on and power-off. A recording medium 200 is a nonvolatile recording medium such as a memory card or a hard disk. A recording medium slot 201 is a slot in which the recording medium 200 is stored. The recording medium 200 stored in the recording medium slot 201 can communicate with the digital camera 100, and can record and play back data. A lid 202 is a lid of the recording medium slot 201. In FIG. 1, the lid 202 is opened and the recording medium 200 is partially taken out from the slot 201 and exposed.

When the knob of the lever 73 is operated in the left direction during multi-playback (i.e., displaying multiple images on the display unit 28 at the same time), the number of displayed images increases, and when the knob is operated in the right direction during multi-playback, the number of displayed images decreases. In other words, the stage of the number of displayed images for multi-playback is switched. In a case where the stage of multi-playback changes, the size of each image decreases as the number of displayed images increases, whereas the size of each image increases as the number of displayed images decreases. In the switching of the number of displayed images, the number is sequentially switched in five stages of 1×1 (one sheet), 3×2 (six sheets), 4×3 (12 sheets), 6×6 (36 sheets), and 10×10 (100 sheets), or in four stages of 1×1 (one sheet), 3×2 (six sheets), 4×3 (12 sheets), and 9×6 (54 sheets). After one-sheet display, further operation of the knob of the lever 73 in the right direction results in an image enlargement operation. When the knob is operated in the left direction from the one-sheet display (single playback, single display), the display is switched to the multi-playback (multiple display).

FIG. 2 is a block diagram showing an exemplary configuration of the digital camera 100 according to the present embodiment.

In FIG. 2, a photographing lens 103 is a lens group including a zoom lens and a focus lens. A shutter 101 has an aperture function. An image capture unit 22 is an image capture device including, for example, a CCD or a CMOS device that converts an optical image into an electric signal. An A/D converter 23 is used to convert an analog signal, output from the image capture unit 22, into a digital signal.

An image processing unit 24 performs predetermined pixel interpolation, resizing processing such as reduction, and color conversion processing on data from the A/D converter 23 or data from a memory control unit 15. The image processing unit 24 performs predetermined calculation processing using captured image data, and a system control unit 50 performs exposure control and ranging control based on the obtained calculation result. As a result, auto focus (AF) processing, automatic exposure (AE) processing, and flash preliminary emission (EF) processing of the through-the-lens (TTL) method are performed. The image processing unit 24 further performs predetermined calculation processing using the captured image data and also performs automatic white balance (AWB) processing of the TTL method based on the obtained calculation result.

The output data from the A/D converter 23 is written directly to a memory 32 via the image processing unit 24 and the memory control unit 15, or via the memory control unit 15 but not involving the image processing unit 24. The memory 32 stores image data obtained by the image capture unit 22 and converted into digital data by the A/D converter 23, and image data to be displayed on the display unit 28. The memory 32 has a sufficient storage capacity to store a predetermined number of still images, and moving images and sounds for a predetermined time.

The memory 32 also serves as a memory for displaying images (video memory). The D/A converter 13 converts the data for displaying images, stored in the memory 32, into an analog signal and supplies the analog signal to the display unit 28. In this way, the data for displaying images written in the memory 32 is displayed on the display unit 28 via the D/A converter 13. The display unit 28 displays an image on a display device such as an LCD according to the analog signal from the D/A converter 13. The digital signal once A/D-converted by the A/D converter 23 and stored in the memory 32 is converted into an analog signal by the D/A converter 13 and successively transferred to the display unit 28 for display, whereby the display unit 28 functions as an electronic viewfinder and can perform through image display (live view display).

A nonvolatile memory 56 is a memory as a recording medium, on which the system control unit 50 having a built-in computer can electrically perform erasing, recording and reading of data. For example, an EEPROM is used as the nonvolatile memory 56. In the nonvolatile memory 56, constants, programs and the like for operation of the system control unit 50 are stored. The program mentioned herein refers to a computer program for executing various flowcharts described later in the present embodiment.

The system control unit 50 controls the entire digital camera 100. By executing the program recorded in the above-mentioned nonvolatile memory 56, each processing of the present embodiment to be described later is realized. A RAM is used as a system memory 52. In the system memory 52, constants and variables for operation of the system control unit 50, the programs read from the nonvolatile memory 56, and the like are developed. In addition, the system control unit 50 also performs display control by controlling, for example, the memory 32, the D/A converter 13, and the display unit 28.

The mode selection switch 60, the shutter button 61, and the operation unit 70 are operation units for inputting various operation instructions to the system control unit 50. The mode selection switch 60 switches the operation mode of the system control unit 50 to one of a still image recording mode, a moving image shooting mode, a playback mode, and the like. Examples of the modes included in the still image recording mode include an automatic shooting mode, an automatic scene discrimination mode, a manual mode, various scene modes that are shooting settings for each shooting scene, a program AE mode, and a custom mode. The mode selection switch 60 makes it possible to directly switch to one of these modes included in a menu screen. Alternatively, after switching once to the menu screen by the mode selection switch 60, it is possible to switch to any one of these modes included in the menu screen by using another operation member. Likewise, the moving image shooting mode may include a plurality of modes.

The system control unit 50 starts a series of photographing processing operations including a still image capturing operation by the image capture unit 22, signal reading from the image capture unit 22, and writing of image data on the recording medium 200, in response to an image capturing instruction by the shutter button 61.

By selecting and operating various function icons displayed on the display unit 28, for example, each operation member of the operation unit 70 is appropriately assigned a function for each scene, and functions as the corresponding one of various function buttons. Examples of the function buttons include an end button, a return button, an image forward button, a jump button, a narrowing-down button, and an attribute change button. For example, when the menu button is pressed, various types of menu screens that can be set are displayed on the display unit 28. The user can intuitively make various settings using the menu screens displayed on the display unit 28, a four-direction button of up, down, left and right, and a SET button. The operation unit 70 further includes the touch panel 70a.

A power supply control unit 80 includes a battery detecting circuit, a DC-DC converter, a switch circuit for switching blocks to be energized, and the like, and detects the presence or absence of a battery mounted, the type of the battery, and the remaining battery level. Furthermore, the power supply control unit 80 controls the DC-DC converter based on the detection result and the instruction from the system control unit 50, and supplies necessary voltage to the units including the recording medium 200 for a necessary period. The power switch 72 is a switch for switching between ON and OFF of the power supply. A power supply unit 30 includes, for example, a primary battery such as an alkaline battery and a lithium battery, a secondary battery such as a NiCd battery, a NiMH battery, and a Li battery, and an AC adapter. A recording medium I/F 18 is an interface with the recording medium 200 such as a memory card or a hard disk. The recording medium 200 is a nonvolatile recording medium such as a memory card for recording an image at the time of photographing, and includes a semiconductor memory, an optical disk, a magnetic disk, or the like.

A communicating unit 54 connects to an external device or a network wirelessly or via a wired cable, and transmits and receives video signals, audio signals, and the like. The communicating unit 54 can also connect to a wireless local area network (LAN) and the Internet. The communicating unit 54 can transmit an image (including a live view) captured by the image capture unit 22 and an image recorded on the recording medium 200, and can also receive image data and other various information from an external device.

In the case where the operation unit 70 includes the touch panel 70a, the system control unit 50 can detect the following operations or states on the touch panel (touch detection).

That a finger or pen that has not been touching the touch panel newly touches the touch panel. This is the start of touch (hereinafter referred to as "Touch-Down").

A state of touching the touch panel with the finger or pen (hereinafter referred to as "Touch-On").

That the finger or pen is moving while touching the touch panel (hereinafter referred to as "Touch-Move").

That the finger or pen that has been touching the touch panel is lifted from the touch panel. This is the end of touch (hereinafter referred to as "Touch-Up").

A state in which nothing touches the touch panel (hereinafter referred to as "Touch-Off").

When Touch-Down is detected, Touch-On is also detected at the same time. After Touch-Down, unless Touch-Up is detected, Touch-On normally continues to be detected. Touch-Move is detected also in a state where Touch-On is detected. Even if Touch-On is detected, Touch-Move is not detected unless the touch position is moving. After it is detected that all of the touching fingers and pens have been lifted (Touch-Up), Touch-Off is detected.

The system control unit 50 is notified of these operations/states and the position coordinates at which the finger or pen is touching the touch panel. The system control unit 50 determines what kind of operation has been performed on the touch panel based on the notified information. Regarding Touch-Move, the moving direction of the finger or pen moving on the touch panel can also be determined for each vertical component/horizontal component on the touch panel based on a change in the position coordinates. Any type of touch panel may be used as the touch panel, such as of a resistance film method, a capacitance method, a surface acoustic wave method, an infrared method, an electromagnetic induction method, an image recognition method, or an optical sensor method. These methods include a method of detecting a touch based on contact with the touch panel, and a method of detecting a touch based on the approach of the finger or pen to the touch panel, but any method may be used.

In the playback mode, thumbnail images such as still images and moving images recorded on the recording medium 200 (images for display in the case of single playback) are displayed in a list. At this time, as the number of playback images (display items) simultaneously displayed on the display unit 28 (multi-playback) is increased, a larger number of playback images can be confirmed, making it easier for the user to locate the image he/she is searching for. Meanwhile, when a large number of playback images are displayed, it is difficult to check the details of each playback image one by one. Therefore, if the user has a rough idea where the desired playback image is located, it is preferable to reduce the number of displayed images in order to make it easier to check the details of each playback image. Here, in a case where the user switches and reduces the number of displayed images on a stage-by-stage basis, among the above multiple stages, while checking the images, the user can narrow down the range in which the desired playback image is likely to be located, thus enabling an efficient search. In the case of increasing the number of displayed images, the size of each playback image decreases on a stage-by-stage basis; therefore, it is easier to find the desired image than in a case where the number of displayed images increases suddenly through several stages and the size of each playback image decreases suddenly. At this time, if the user can recognize the layout (the number of sheets, the size of the image, the display position) of the playback images originally displayed as well as the layout of the playback images after the switching, the user can perform an operation while predicting how the display will change when continuing this operation. This makes it possible to perform the switching operation intuitively.

Switching the number of displayed images during multi-playback also changes the number of images that can be displayed in a single row or column. As a result, a layout change may occur in which, for example, the playback image at the right end moves to the left end. In a case where the switching of the number of displayed images during multi-playback as described above is performed by a pinch operation, if the multi-playback images themselves are enlarged/reduced in accordance with the pinch operation, it is necessary to move each playback image to the display position after the switching in the middle of the operation and to change the layout instantaneously. When the playback image moves in the middle of the operation or the layout is switched instantaneously, it is difficult for the user to understand how the layout has changed before and after the switching. For example, in a case where the size of the playback image largely changes before and after the switching, if the playback image before the switching is enlarged, it is difficult to understand how much the size of the playback image has changed before and after the switching. In this way, unless the change of the multi-playback images before and after the switching is known, it is difficult to understand what kind of change is occurring. In this case, if the user finds out that the image is not a desired one after completion of the switching, the user has to perform an operation for returning the display again. In addition, since the pinch operation may also be assigned a function such as enlargement or reduction of the image (continuous change in size), it is difficult to understand whether the operation currently performed by the user is recognized as an operation for changing the size of the image, or as an operation for switching the number of displayed images. In other words, the user does not understand, until the switching is complete, whether a part of the playback images is displayed in an enlarged (or reduced) manner without changing the layout or the display is being switched along with the change in the layout. In this case, there is also a possibility that the user does not understand through which operation the number of displayed images is switched, and the switching of the number of displayed images cannot be performed after all.

In the present embodiment, display processing in the case of switching the number of stages of the displayed images in multi-playback will be described.

Figure 3A:
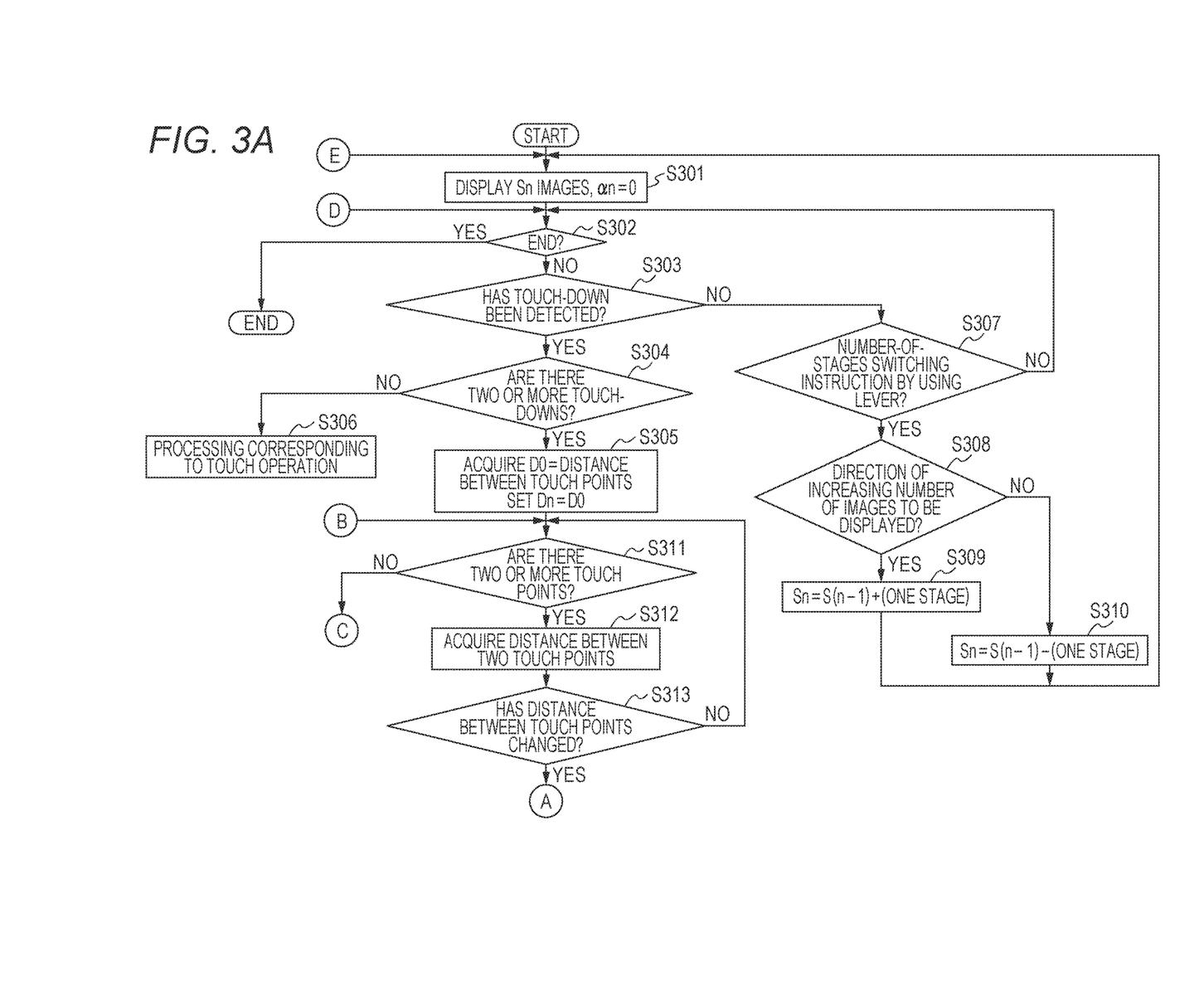
FIGS. 3A to 3C are flowcharts showing display processing for multi-playback images according to one or more aspects of the present disclosure.
Figure 3B:
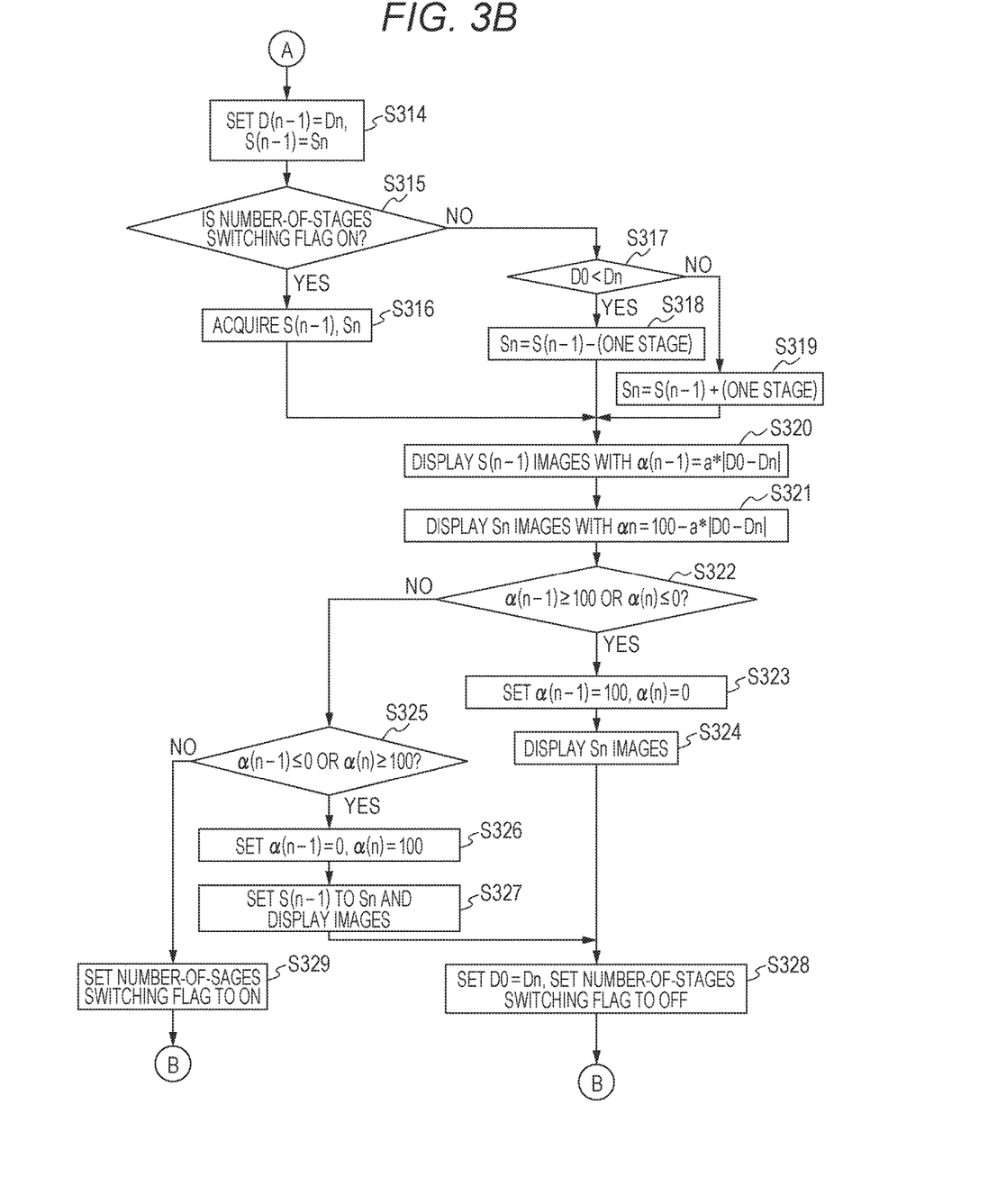
Figure 3C:
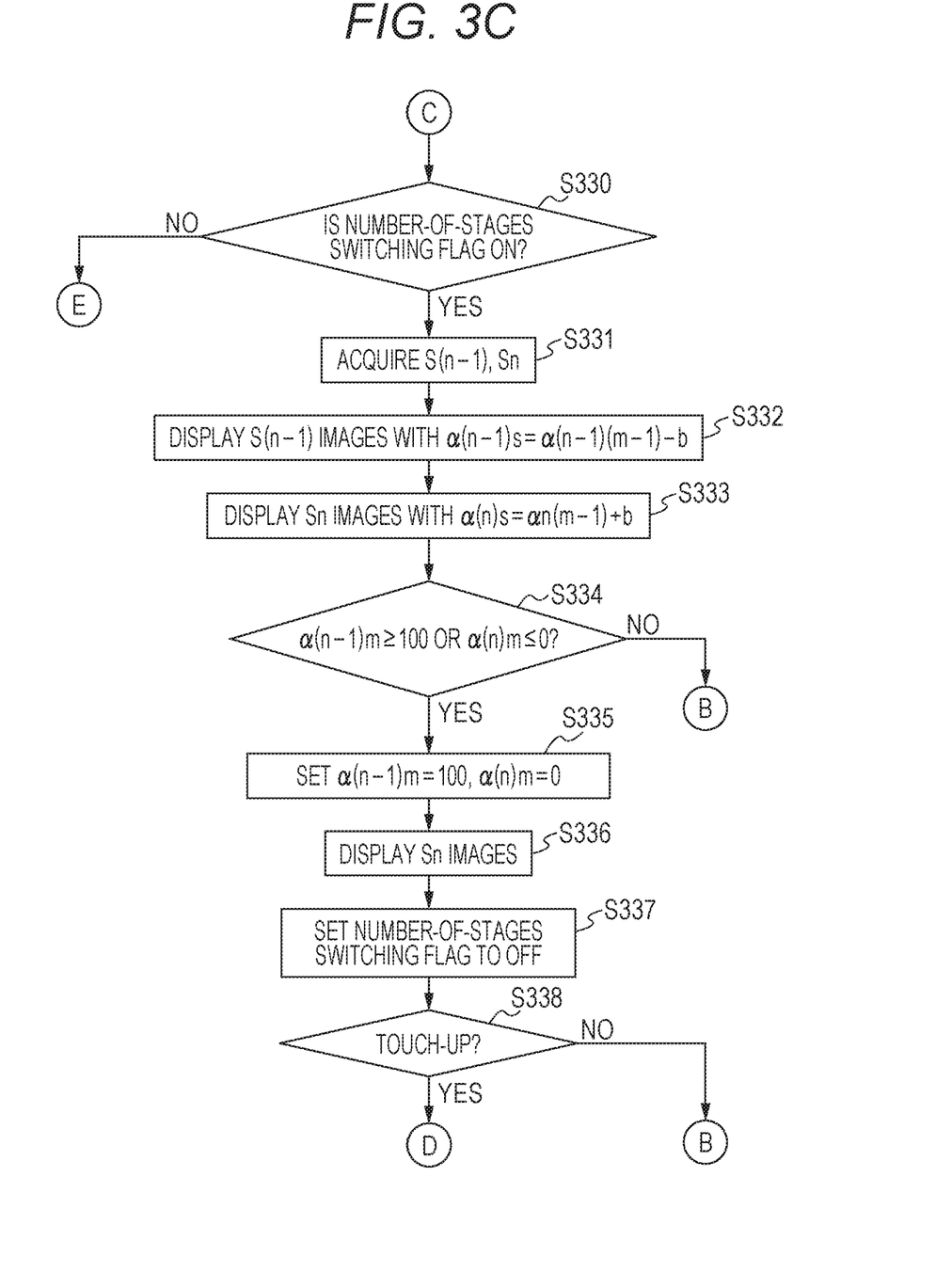

The multi-playback display processing in the present embodiment will be described with reference to FIGS. 3A to 3C.

This processing is realized by developing the program recorded in the nonvolatile memory 56 in the system memory 52 and executing the program by the system control unit 50. This processing starts when the digital camera 100 is turned on and switched to the playback mode. Note that the number of displayed images will be described as four stages of 1×1 (one sheet), 3×2 (six sheets), 4×3 (12 sheets), and 9×6 (54 sheets). The multi-playback image includes playback images of the number of displayed images Sn (hereinafter sometimes referred to as "display number Sn") at any of the four stages.

Figure 4A:
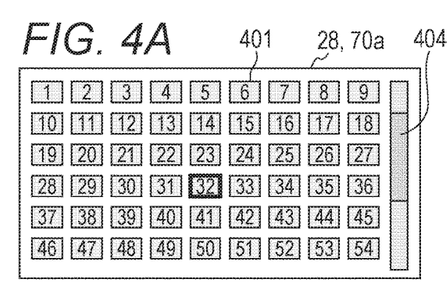
FIGS. 4A to 4H are views showing switching of the multi-playback images according to one or more aspects of the present disclosure.
Figure 4B:
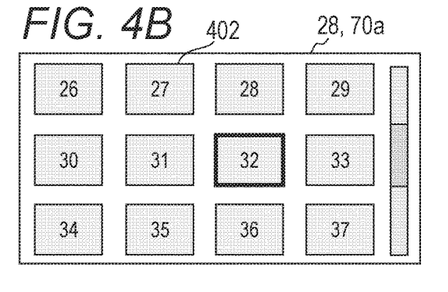

In S301, as shown in FIG. 4A, the system control unit 50 displays the playback images (multi-playback images 401) of the display number Sn with a transparency αn=0 (opacity: 100). Here, the display number Sn is the number of playback images in the multi-playback currently displayed on the display unit 28, and is, for example, 6 or 12. The transparency αn indicates the display density of the multi-playback images of the display number Sn on the display unit 28. As the transparency increases from the transparency αn=0 (opacity: 100) to αn=100 (opacity: 0), the multi-playback images become transparent and eventually disappear. The multi-playback images 401 shown in FIG. 4A are playback images in the case where the display number Sn is 54. At this time, if the playback image 32 is selected, the playback image 32 may be surrounded by a thick frame, or the playback image 32 may be identified and displayed in a different display format from the other playback images.

In S302, the system control unit 50 determines whether an operation to end the playback mode has been performed. The playback mode ends when the operation to display the menu screen or the operation to display the live view (LV) image is performed, the enlargement operation is performed from the state of single playback (one-sheet display), or the power is turned off. In a case where it is determined that the operation to end the playback mode has been performed, the processing in the playback mode ends; otherwise the processing proceeds to S303.

In S303, the system control unit 50 determines whether Touch-Down (start of touch) to the touch panel 70a has been detected. In a case where it is determined that the Touch-Down has been detected, the processing proceeds to S304; otherwise the processing proceeds to S307.

In step S304, the system control unit 50 determines whether two or more Touch-Downs have occurred, including the Touch-Down determined in step S303. In a case where it is determined that there are two or more Touch-Downs, the processing proceeds to S305; otherwise (i.e., if the Touch-Down has occurred at one point) the processing proceeds to S306. In the present embodiment, even if there are three or more Touch-Downs, the coordinates of the first two Touch-Downs are acquired but the touch points on and after the third Touch-Down are not used for the processing regardless of the touching state thereof. The two points of the first two Touch-Downs are considered.

Figure 4C:
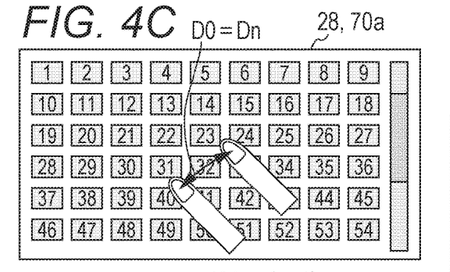

In S305, the system control unit 50 acquires the distance between the two touch points (the distance between the two touched points), which are the Touch-Downs determined in S303 and S304, and records the distance in the system memory 52 as D0. FIG. 4C shows two touches performed on the multi-playback images 401 when the display number Sn is 54.

In S306, the system control unit 50 performs processing corresponding to a touch operation of touching one point, which is the Touch-Down determined in S303 and S304. The processing corresponding to the touch operation of touching one point is, for example, scroll or selection of a playback image for single playback. When scroll is performed, the currently displayed multi-playback images of the display number Sn move, and playback images of a different display number Sn are displayed. When scroll is performed in the state of FIG. 4A, the multi-playback images 401, displayed with the playback images 1 to 54 included therein, are switched to playback images 10 to 63, for example. At this time, the playback images move according to the scroll direction of the display position on a scroll bar 404 and the positions of the playback images. However, when the number of displayable playback images is less than the display number Sn, the playback images are displayed in a smaller number than Sn in the first place; therefore, even if the scroll operation is performed, the displayed playback images do not change.

In step S307, the system control unit 50 determines whether there is a number-of-stages switching instruction by the lever 73. In a case where it is determined that there is the number-of-stages switching instruction, the processing proceeds to S308; otherwise the processing proceeds to S302.

In step S308, the system control unit 50 determines whether the number-of-stages switching instruction issued in step S307 is an instruction to increase the number of displayed images. When the knob of the lever 73 is operated in the left direction, it is determined that the number-of-stages switching instruction is an instruction to increase the number of displayed images. When the knob is operated in the right direction, it is determined that the number-of-stages switching instruction is an instruction to decrease the number of displayed images. In a case where it is determined that the number-of-stages switching instruction is an instruction to increase the number of displayed images, the processing proceeds to S309; otherwise the processing proceeds to S310.

In S309, the system control unit 50 increases the display number Sn after switching by one step from the display number S(n−1) before the operation in S307, that is, sets the display number Sn so that the number of displayed images increases. Specifically, in the case of S(n−1)=1×1 (one sheet), the number is set to obtain Sn=3×2 (six sheets), and in the case of S(n−1)=4×(12 sheets), the number is set to obtain Sn=9×6 (54 sheets). At this time, in the case of S(n−1)=9×6 (54 sheets), since there is no stage with a larger number of displayed images, the processing proceeds to S301 without resetting Sn.

In S310, the system control unit 50 decreases the display number Sn after the switching by one step from the display number S(n−1) before the operation in S307, that is, sets the display number Sn so that the number of displayed images decreases. That is, in the case of S(n−1)=3×2 (six sheets), the number is set to obtain Sn=1×1 (one sheet), and in the case of S(n−1)=9×6 (54 sheets), the number is set to obtain Sn=4×3 (12 sheets). At this time, in the case of S(n−1)=1×1 (one sheet), the number of displayed images does not further decrease, resulting in an enlargement instruction in single playback. Therefore, in a case where it is determined as No in S308 during single playback, the multi-playback processing ends and the display is enlarged.

In S311, the system control unit 50 determines whether the current touch point includes two points or more. In a case where it is determined that the number of touch points is two or more, the processing proceeds to S312; otherwise the processing proceeds to S330.

In S312, the system control unit 50 acquires the distance between the current positions of the two touch points determined in S304.

Figure 4D:
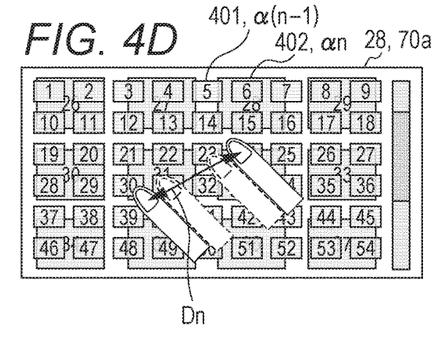

In S313, the system control unit 50 compares the distance between the touch points acquired in S312 previously or Dn (D0) set in S305 with the distance between the touch points acquired in immediately preceding S312, and determines whether the distance has changed. FIG. 4D shows a state in which the distance between the touch points has increased from the state of FIG. 4C. An operation for increasing the distance between touch points in this way is called pinch-out. Also, an operation for narrowing the distance between touch points is called pinch-in. In a case where it is determined that the distance between the touch points has changed, the processing proceeds to S314; otherwise the processing returns to S311. In a case where the touch position does not move after the Touch-Down in S303, even if the touch is released after the determination of No in S313, the display does not change and the images of the number Sn displayed in S301 remain displayed.

In S314, the system control unit 50 resets the value, set as Dn until S311, to D(n−1), and further resets the number of displayed images, set as Sn until S311, to S(n−1). That is, since it is determined in S313 that the distance between the touch points has changed, the system control unit 50 updates the distance between the touch points, updates the number of displayed images before the determination in S313 to S(n−1), and records the updated values in the system memory 52. However, in a case where a number-of-stages switching flag to be described later is ON, the display number Sn is not updated.

In S315, the system control unit 50 determines whether the number-of-stages switching flag is ON. The number-of-stages switching flag indicates whether the user is in the process of switching the number of the displayed playback images, that is, whether the user is performing pinch-in or pinch-out (issuing a number-of-stages switching instruction) and switching to the next number of stages, from the state in which the multi-playback images are displayed as in S301. Note that, in a case where the number-of-stages switching flag is ON, the multi-playback images before the switching are displayed with a lower density than the case of the transparency 0. In a case where the number-of-stages switching flag is off, the multi-playback images are displayed with the transparency 0 as shown in FIGS. 4A and 4C; the number-of-stages switching instruction has not been accepted in this state. In a case where the number-of-stages switching flag is ON, the processing proceeds to S316; otherwise the processing proceeds to S317.

In S316, the system control unit 50 acquires, from the system memory 52, the display number S(n−1) before the switching and the display number Sn after the switching.

In S317 to S319, it is determined whether the number of stages of displayed images is switched to increase or decrease the number of displayed images.

In S317, the system control unit 50 compares the distance (D0) between the touch points at the start of the touch acquired in S305 or S328 with the distance (Dn) between the (current) touch points acquired in S312. Then, it is determined whether the operation has been performed to increase or decrease the distance between the touch points. In other words, it is determined whether the operation has been performed to reduce the number of displayed images by pinch-out, or to increase the number of displayed images by pinch-in. In a case where D0<Dn is satisfied, that is, it is determined that the operation has been performed to increase the distance between the touch points, the processing proceeds to S318; otherwise the processing proceeds to S319.

In S318, the system control unit 50 sets the display number Sn after the switching to the number of displayed images reduced by one stage from the display number S(n−1) before the switching. In a case where the multi-playback images 401 are displayed with Sn=54 as in FIG. 4C, when the number of displayed images decreases by one stage, multi-playback images 402 are displayed with Sn=12 as in FIG. 4E. In this manner, the display number Sn after the switching is set so that the number decreases by one stage, and the display number Sn is recorded in the system memory 52. However, in a case where single playback is performed before the switching operation with S(n−1)=1, the pinch-out is the enlarging operation; therefore, the processing of S318 is not performed and the display processing of the multi-playback ends.

In S319, the system control unit 50 sets the display number Sn after the switching to the number of displayed images increased by one stage from the display number S(n−1) before the switching, and records the display number in the system memory 52. However, in a case where S(n−1) is 54, since there is no stage with a larger number of displayed images, the processing of S319 is not performed and the processing returns to S301.

Figure 4E:
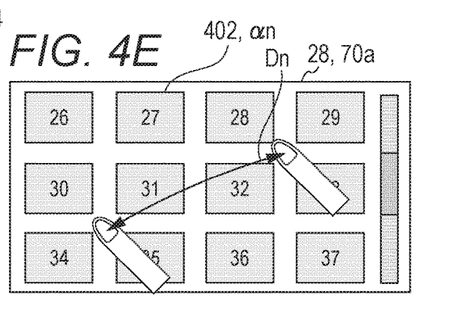
Figure 4F:
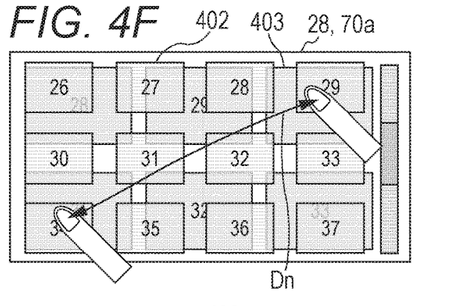

In S320, the system control unit 50 displays the multi-playback images of the display number S(n−1) before the switching with a transparency α(n−1)=a*|D0−Dn|. That is, the images are displayed with the transparency α(n−1), which is obtained by adding, to the transparency αn=0 in S301, a value obtained by multiplying the change in the distance between the touch points (|D0−Dn|) by a. The larger the distance between the touch points becomes, the higher the transparency of the multi-playback images before the switching becomes (in the course of the operation), resulting in the images displayed with a lower density. In FIG. 4D, the transparency α(n−1) of the multi-playback images 401 before the switching (display number Sn=54) is higher than the transparency (αn=0) of the multi-playback images 401 (display number Sn=54) in FIG. 4C showing the state before the switching operation is performed. In FIG. 4F, switching of the number of displayed images is instructed in the state in which the multi-playback images 402 are displayed as in FIG. 4E. In this case, the transparency α(n−1) of the multi-playback images 402 gradually becomes higher, and the transparency αn of multi-playback images 403 with the display number Sn=6 gradually becomes lower. Furthermore, in a case where the number of displayed images changes from that of the multi-playback images 403 (display number Sn=6) in FIG. 4G to that of the multi-playback images 402 (display number Sn=12) in FIG. 4E, the transparency α(n−1) of the multi-playback images 403 before the switching gradually becomes higher as shown in FIG. 4F. That is, before the switching is complete, the multi-playback images before the switching are displayed with a higher density than after completion of the switching. Furthermore, the transparency αn of the multi-playback images 402 after the switching gradually becomes lower (the images are displayed with a lower density than after completion of the switching). The constant a is, for example, a value such as 20 ((transparency)/cm) or 25 ((transparency)/cm). In the middle of switching, the identification display (display of a selection frame) of the selected playback image is stopped. When the switching is complete and the user's touch operation is finished, the playback image at the touch position is selected again (identification display).

In S321, the system control unit 50 displays the multi-playback images of the switched display number Sn with a transparency $\alpha n = 100 - a * |D0 - Dn|$. In other words, the images are displayed with the transparency obtained by subtracting, from the transparency $\alpha n = 100$ in S301, a value obtained by multiplying the change in the distance between the touch points ($|D0-Dn|$) by a. Every time the distance between the touch points widens, the transparency of the multi-playback images becomes lower and the images are displayed with a higher density. Note that the constant a used for determining the transparency in S320 and S321 may be different between S320 and S321. For example, the degree to which the density of the multi-playback images after the switching becomes higher may be higher than the degree to which the density of the multi-playback images before the switching becomes lower.

In S322, the system control unit 50 determines whether any of the following conditions is satisfied or neither is satisfied: the transparency $\alpha(n-1)$ of the multi-playback images before the switching set in S320 is 100; and the transparency $\alpha n$ of the multi-playback images after the switching set in S321 is 0. In a case where it is determined that any of the transparency $\alpha(n-1)=100$ and $\alpha n=0$ is satisfied, the processing proceeds to S323; otherwise (i.e., if neither is satisfied) the processing proceeds to S325. Alternatively, the determination in S322 may be made based on whether the change in the distance between the touch points has reached a predetermined distance. In other words, the switching of the image may be completed when there is a change in the distance between the touch points that is equal to or greater than a predetermined value.

In S323, the system control unit 50 sets the transparency $\alpha(n-1)=100$ and $\alpha n=0$, and records the transparency in the system memory 52. That is, the transparency of the multi-playback images before switching is set to 100 (not displayed), and the transparency of the multi-playback images after switching is set to 0 (fully displayed). In this manner, in accordance with the change in the distance between the touch points, the transparency of the multi-playback images before switching is gradually increased and the transparency of the multi-playback images after switching is gradually lowered, whereby the number of displayed images is switched.

In S324, the system control unit 50 displays the multi-playback images of the display number Sn on the display unit 28. That is, by pinch-out started in a state where the multi-playback images before switching are fully displayed as in FIG. 4C, the display of the switching in transition is obtained as in FIG. 4D. When the user continues the pinch-out, the multi-playback images after the switching are fully displayed eventually, as shown in FIG. 4E.

In S325, the system control unit 50 determines whether any of the following conditions is satisfied or neither is satisfied: the transparency $\alpha(n-1)$ of the multi-playback images before switching set in S320 has become 0; and the transparency $\alpha n$ of the multi-playback images after switching set in S321 has become 100. In a case where it is determined that any of the transparency $\alpha(n-1)=0$ and $\alpha n=100$ is satisfied, the processing proceeds to S326; otherwise (i.e., if neither is satisfied) the processing proceeds to S329.

In S326, the system control unit 50 sets the transparency $\alpha(n-1)=0$, $\alpha n=100$ and records the transparency in the system memory 52. Unlike S323, in S326, although the user has started the number-of-stages switching instruction, the user performs an operation for displaying the playback images of the original display number S(n-1). Therefore, the transparency $\alpha(n-1)$ of the multi-playback images before the switching is set to 0. In other words, after performing pinch-in (pinch-out) to increase (reduce) the number of displayed images, the user performs pinch-out (pinch-in) before the multi-playback images are completely switched. As a result, the original multi-playback images are displayed. In this way, in a case where the user once tries to switch the number of displayed images but then determines, during switching, that the number of displayed images will be larger or smaller than expected, it is also possible to cancel the switching of the display number before the switching is complete since the progress of the switching is visible.

In step S327, the system control unit 50 displays the multi-playback images of the display number S(n-1) on the display unit 28.

In S328, the system control unit 50 sets D0=Dn and sets the number-of-stages switching flag to OFF. Since the switching of the number of stages of the multi-playback images has ended in S324 or S327, the distance between the touch points is reset in S328 (the distance Dn between the current touch points is reset to D0). Thus, the display can be switched continuously by one touch operation without releasing the touch. That is, after switching from the multi-playback images 401 to the multi-playback images 402 shown in FIG. 4E by the pinch-out started in FIG. 4C, if the pinch-out is further continued without releasing the touch, the display is switched to the multi-playback images 403 shown in FIG. 4G. In this manner, since multi-stage switching of multi-playback images can be performed by one pinch operation, the user can quickly switch to multi-playback images of the desired display number. Since the switching of the display for one stage has been completed, the number-of-stages switching flag is set to OFF. When the distance between the touch points changes from D0 set in S328, the state is changed again to the number-of-stages switching state. Note that a setting may be made in which the next number-of-stages switching operation is not accepted (the number of stages is not switched even if a pinch operation is performed) unless Touch-Up is performed every time the number-of-stages switching flag is set to OFF.

In a case where the determination is NO in S322 and NO in S325, the system control unit 50 sets the number-of-stages switching flag to ON and records the flag in the system memory 52 in S329. That is, the number-of-stages switching flag is set to ON in a case where it is determined that both multi-playback images before and after switching are being displayed with the transparency falling within the range of $0 < \text{transparency } \alpha n, \alpha(n-1) < 100$, and that the switching is in progress. However, when the number-of-stages switching flag is already ON, the processing of S329 need not be performed.

The processing of S330 to S338 is performed in a case where the user lifts his/her finger during the pinch operation. In this processing, even if the pinch operation of the user is interrupted after the switching is started in accordance with the pinch operation initiated by the user, the switching of display will be complete after a predetermined period of time.

In S330, the system control unit 50 determines whether the number-of-stages switching flag is ON. That is, when it is determined in S329 that the number of touch points is one or the touch has been released, the system control unit 50 determines whether the switching of display of the multi-playback images is in progress. In a case where it is determined that the number-of-stages switching flag is ON, the processing proceeds to S331; otherwise the processing returns to S301.

In S331, the system control unit 50 acquires, from the system memory 52, the display number S(n−1) before the switching and the display number Sn after the switching. In other words, the system control unit 50 acquires information on the transition from displaying how many images (currently) to displaying how many images.

Figure 4G:
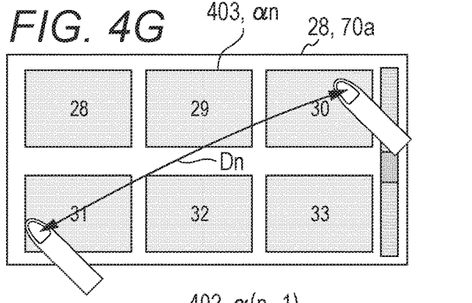
Figure 4H:
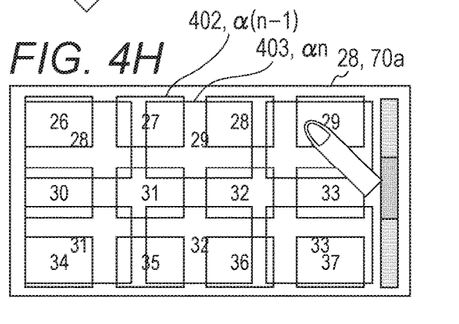

In S332, the system control unit 50 sets the current transparency α(n−1)m to a value obtained by subtracting b from the previous transparency α(n−1) (m−1) and displays the multi-playback images before the switching. In other words, the transparency is set such that the density of the multi-playback images before the switching becomes slightly lower. Note that the processing in S332 and S333 is performed at predetermined time intervals of, for example, 0.2 seconds or 0.3 seconds, and b is a value such as 10 or 15, for example. Even after releasing the touch, the transparency gradually approaches 100, and the images before the switching disappear. FIG. 4H shows a display example in S332 and S333 in a case where the number of touch points has changed from two to one. FIG. 4H shows a state in which the number of touch points has changed to one during the switching from the multi-playback images 402 to the multi-playback images 403 in FIG. 4F. At this time, the multi-playback images 402 are displayed with a lower density than when the two points have been touched in FIG. 4F (than before Touch-Up is performed) as time elapses, and the multi-playback images 403 are displayed with a higher density than in FIG. 4F as time elapses.

In S333, the system control unit 50 sets the current transparency αns to a value obtained by adding b to the previous transparency αn(m−1), and displays the multi-playback images after the switching. In other words, transparency of the multi-playback images before the switching is slightly higher. Unlike S332, the transparency of the multi-playback images after the switching gradually approaches 0, and eventually the multi-playback images after the switching are fully displayed. In this way, once the pinch operation is started, even if the pinch operation is canceled halfway (the touch is released, or one point is touched), the display is switched in the direction of the operation started by the user. Therefore, the user can switch the display with a little operation. In other words, as long as the pinch operation is started in the direction corresponding to each instruction to reduce or increase the number of displayed images, the operation does not have to be continued until the switching is complete.

Note that, similarly to the constant a described in S320 and S321, the constant b may be different between S332 and S333.

In S334, the system control unit 50 determines whether any of the following conditions is satisfied or neither is satisfied: the transparency α(n−1)m set in S332 has reached 100; and αns set in S333 has reached 0. In a case where it is determined that any of the above is satisfied, the processing proceeds to S335; otherwise the processing proceeds to S311.

In S335, the system control unit 50 sets the transparency α(n−1)=100, αn=0 and records the transparency in the system memory 52.

In S336, the system control unit 50 displays the multi-playback images after the switching. When the touch is released during the switching from the multi-playback images 402 to the multi-playback images 403 in FIG. 4F, the multi-playback images 403 are fully displayed while the transparency thereof is changed without completing the pinch operation. That is, the transparency of the multi-playback images 402 of FIG. 4H gradually increases, and the transparency of the multi-playback images 403 gradually decreases. When the switching is complete, the multi-playback images 403 of FIG. 4G are fully displayed.

In S337, the system control unit 50 sets the number-of-stages switching flag to OFF and records the flag in the system memory 52.

In S338, the system control unit 50 determines whether the touch has been released from the touch panel 70a. In a case where it is determined that the touch has been released (the two points of touch determined in S304 have been both released), the processing proceeds to S302; otherwise (i.e., if one point is being touched) the processing proceeds to S311. In a case where one point is still being touched, the processing proceeds to S311, where the number-of-stages switching operation can be performed again if the touch on the second point is accepted.

According to the embodiment described above, it is possible to improve the operability in switching the number of displayed playback images (switching the type and number of stages of multi-playback images). That is, after starting the pinch operation, the user can understand, before switching of the multi-playback images is complete, that the switching is proceeding in response to the pinch operation and the state of the images before and after the switching. Therefore, the user can understand that the switching will be complete if the pinch operation is further continued.

In addition, in a case where the same image is included both after and before switching as in the switching of the multi-playback images, if the screens before and after the switching are displayed so as to be visible to the user during the switching, it becomes easy for the user to recognize the change in the size and layout of the displayed images. Note that the present embodiment can also be applied to switching other than that of multi-playback images. For example, the present embodiment can be applied to a case of changing the size or layout of a displayed icon for executing a function in response to a touch, and a case of changing the size of characters or the number of rows in a sentence. The present embodiment is also applicable to a case of changing the layout and display size of a text, a web page, a table, and the like including both a sentence and an image. In the case of a map, the scale changes and the unit of a range displayed on the display unit 28 changes from a town to a country. Therefore, it is possible to show the user that the scale is changing gradually, by showing the user the process of switching.

Here, the layout change is not limited to a change of the display position accompanied by a change in the size of the playback image as described in the above embodiment, but also includes a case where the display position or the display format is changed even for an item of the same size. In other words, the layout change is applicable to a case where the layout is changed to a different pattern of layout in which the same items are displayed in the same number but at different positions. Examples of this case include a layout of furniture and a layout of images in image editing in which various patterns are successively displayed through a pinch operation. The layout change is also applicable to cases where the image expression method is changed, such as changing the color of a certain image, expressing an image as an aged and worn image, or changing an image into one of a painting style. Even when only the display position or the display format changes as described above, if the size of the image (item) changes during the switching operation such as a pinch operation, the user may erroneously recognize that the enlargement or reduction is being performed. If the size changes suddenly, it is also difficult to recognize the change before and after the switching. However, by superimposing the images before and after the switching without changing the size thereof, the user can recognize the change caused by the switching. Furthermore, since the user can perform an operation while predicting what kind of change will finally occur by the operation being performed, it is possible to return to the original display before switching is complete.

In the above embodiment, it has been described that the display is switched by the pinch operation. However, as long as the operation is to execute a function according to the operation amount, the operation may be instead Touch-Move from a predetermined position or Touch-Move after a double tap. Furthermore, switching may be performed according to the pressing force on a pressure-sensitive panel that detects the pressing. That is, the multi-playback images may be switched such that the number of displayed images increases when the pressing force on a predetermined position increases, while the number of displayed images decreases when the pressing force on another position increases. In the case of switching the image by the pressing force, when the pressing force weakens or the touch is released during switching, the image may be returned to the image before the switching in the middle of the switching, or the image after the switching may be displayed. Furthermore, it is possible to switch the multi-playback images according to a gesture operation of widening or narrowing the palm. The multi-playback images may also be switched in response to an operation on an operation member. For example, the switching may be performed in response to a depression of a button for a predetermined time or an operation to tilt a lever. When the number of displayed images in multi-playback is successively switched through several stages, the size of the display items changes continuously along with the switching of the number of images.

In the above embodiment, it has also been described that multi-playback ends when an image is enlarged in single playback. That is, after reducing the enlarged image in the single playback to the normal display (not enlarged) by pinch-in, the switching operation is accepted once the touch is released, in order not to shift directly to the multi-playback without intention (the number of displayed images is not switched unless Touch-Down is detected in S303). However, the present disclosure is not limited to this example, and it is possible to perform the process from the enlarged state of the image to the switching of the number of displayed images in the multi-playback by a series of operations.

Furthermore, in the above embodiment, it has been described that the transparency of the multi-playback images is changed in accordance with a change in the distance between touch points. Alternatively, however, the degree of blur of an image before switching may be changed.

In addition, it has been described in S318 that in the case where the pinch-out performed for switching from the multi-playback to the single playback is further continued, the number of displayed images cannot be switched any more. In this case, the screen may be darkened according to the operation amount of the pinch-out. That is, the user can recognize that the number of displayed images cannot be switched any more since the next screen does not become visible even slightly even if the user continues pinch-out. Also, the same is true for the case of Sn=54; it has been described that the number of displayed images cannot increase further even by pinch-in. At this time, the screen may be darkened according to the operation amount of the pinch-in.

In the above embodiment, it has been described that at the time of switching the multi-playback images, the images before and after the switching are superimposed and displayed without changing the size of the multi-playback images (playback images). However, at the time of switching from the single playback to the multi-playback, the following operation may be performed. Specifically, at the time of switching from Sn=1 to Sn=6, the size of the playback image may be reduced in accordance with pinch-in and at the same time the transparency of the multi-playback images after the switching may be lowered. At the time of switching the multi-playback images to decrease the number of displayed images, the operation is as described in the above embodiment. At the time of switching from the number of displayed images Sn=6 to Sn=1, however, an image to be displayed may be enlarged according to the distance between touch points in pinch-out. That is, any of the six playback images is enlarged in accordance with the pinch-out, and the transparency of the multi-playback images before the switching is made higher. At this time, the transparency of the image to be displayed in single playback (in this case, the playback image after the switching) is lowered.

In addition to the above embodiment, the present disclosure can also be applied to a case where the hierarchy to be displayed is changed by pinch-in or pinch-out. For example, the present disclosure is also applicable to a case where the screen is shifted to a screen of a lower hierarchy by pinch-in and to a screen of an upper hierarchy by pinch-out. In this case as well, the transparency is changed during switching to indicate that the switching is in progress.

As the method of changing the transparency, corresponding positions of the images before and after switching may be allocated to each pixel, and a ratio between the positions allocated to the pixel may be changed. Alternatively, the transparency may be changed by gradually changing the ratio between the corresponding positions of the images before and after the switching in each pixel, such as 1:9, 3:7, and then 5:5. The method of changing the transparency is not limited to these examples, as long as the user can indicate that the display densities of the preceding and succeeding images have been changed.

Note that the above-described various kinds of control, described as being performed by the system control unit 50, may be performed by a single piece of hardware or by a plurality of pieces of hardware in a shared manner in order to control the entire apparatus.

Although the present disclosure has been described in detail based on the preferred embodiments, the present disclosure is not limited to these specific embodiments, and various embodiments within the scope not departing from the gist of the present disclosure are also included in the present disclosure. Furthermore, each of the above embodiments is merely one embodiment of the present disclosure, and the embodiments can be combined as appropriate.

In the above embodiment, the case where the present disclosure is applied to the digital camera 100 has been described as an example. However, the present disclosure is not limited to this example, as long as the display control apparatus can change display according to the amount of operations performed in a stepwise manner. That is, the present disclosure is applicable to, for example, a mobile phone terminal, a portable image viewer, a digital photo frame, a music player, a game console, an electronic book reader, a tablet PC, a smartphone, a projection device, and a household electronic device having a display unit.

Other Embodiments

The present disclosure can also be realized by executing the following processing. That is, in this processing, software (program) for realizing the functions of the above embodiment is supplied to a system or apparatus via a network or various recording media, and a computer (or CPU, MPU, or the like) of the system or apparatus reads the program code and executes the program. In this case, the program and the recording medium storing the program constitute the present disclosure.

According to an embodiment of the present disclosure, it is possible to improve the operability in switching screens in response to an operation of a predetermined operation amount or more.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-096256, filed May 12, 2016, which is hereby incorporated by reference herein in its entirety.

What is claimed is:

1. A display control apparatus comprising:
   an accepting unit configured to accept a predetermined operation from a user;
   a switching unit configured to switch between a first screen on which a display item is displayed in a first layout, and a second screen which includes at least one display item displayed with a first size on the first screen and on which the display item is displayed with a second size different from the first size and the display item is displayed in a second layout; and
   a display control unit configured to perform control such that, during the predetermined operation for switching from the first screen to the second screen by the switching unit, the first screen and the second screen are displayed while being superimposed without continuously changing the size of the display item in accordance with the predetermined operation, and upon completion of the predetermined operation, the second screen is displayed without the first screen and the second screen being superimposed.

2. The display control apparatus according to claim 1, wherein a first number of display items with the first size are displayed on the first screen, and a second number of display items with the second size are displayed on the second screen.

3. The display control apparatus according to claim 1, wherein the display item on the first screen is displayed with a lower density during the predetermined operation than before the predetermined operation is started.

4. The display control apparatus according to claim 1, wherein the display item on the first screen is displayed with a higher transparency during the predetermined operation than before the predetermined operation is started.

5. The display control apparatus according to claim 1, wherein the display item on the second screen is displayed with a lower density during the predetermined operation than after completion of the predetermined operation.

6. The display control apparatus according to claim 1, wherein the display item on the second screen is displayed with a higher transparency during the predetermined operation than after completion of the predetermined operation.

7. The display control apparatus according to claim 1, wherein the first size is larger than the second size, and a first number is smaller than a second number.

8. The display control apparatus according to claim 1, wherein a transparency of the display item on the first screen is increased according to an operation amount of the predetermined operation until the predetermined operation is complete.

9. The display control apparatus according to claim 1, wherein a transparency of the display item on the second screen is lowered according to an operation amount of the predetermined operation until the predetermined operation is complete.

10. The display control apparatus according to claim 1, wherein the switching unit further switches from the second screen to a third screen on which the display item is displayed in a third layout, upon completion of the next predetermined operation that has been started following the previous predetermined operation for switching from the first screen to the second screen.

11. The display control apparatus according to claim 1, further comprising a touch detecting unit configured to detect a touch operation on a touch panel,
wherein the predetermined operation is a pinch operation of changing a distance between two touched points on the touch panel.

12. The display control apparatus according to claim 11, wherein a number of the display items displayed on a display unit increases as a result of an operation for narrowing the distance between the two touched points in the pinch operation, and the number of the display items displayed on the display unit decreases as a result of an operation for widening the distance between the two touched points.

13. The display control apparatus according to claim 1, wherein the display item is a playback image.

14. The display control apparatus according to claim 1, wherein a layout of the display item is different between the first screen and the second screen.

15. The display control apparatus according to claim 1, wherein, when switching from a fourth screen on which a single display item is displayed to the first screen by the switching unit, the display control unit performs control such that the size of the display item on the fourth screen is reduced according to an operation amount of the predetermined operation, and that the display item on the first screen and the display item on the fourth screen are displayed while being superimposed.

16. The display control apparatus according to claim 1, wherein, when switching from the first screen to a fourth screen on which the single display item is displayed by the switching unit, the display control unit performs control such that the size of the display item on the first screen is increased according to an operation amount of the predetermined operation, and that the display item on the first screen and the display item on the fourth screen are displayed while being superimposed.

17. The display control apparatus according to claim 1, wherein, when the predetermined operation that has been started while the first screen is displayed is interrupted before the predetermined operation is complete, the switching unit switches to the second screen after a predetermined lapse of time from an interruption of the predetermined operation.

18. The display control apparatus according to claim 1, wherein the display control unit performs control such that, during the predetermined operation for switching from the first screen to the second screen by the switching unit, the size of the display item included in the first screen remains unchanged from before the predetermined operation is started, and the size of the display item included in the second screen remains unchanged from after the completion of the predetermined operation.

19. A method of controlling a display control apparatus, the method comprising:
accepting a predetermined operation from a user;
switching between a first screen on which a display item is displayed in a first layout, and a second screen which includes at least one display item displayed with a first size on the first screen and on which the display item is displayed with a second size different from the first size and the display item is displayed in a second layout; and
performing control such that, during the predetermined operation for switching from the first screen to the second screen, the first screen and the second screen are displayed while being superimposed without continuously changing the size of the display item in accordance with the predetermined operation, and upon completion of the predetermined operation, the second screen is displayed without the first screen and the second screen being superimposed.

20. A non-transitory computer-readable storage medium storing a program for executing a method of controlling a display control apparatus, the method comprising:
accepting a predetermined operation from a user;
switching between a first screen on which a display item is displayed in a first layout, and a second screen which includes at least one display item displayed with a first size on the first screen and on which the display item is displayed with a second size different from the first size and the display item is displayed in a second layout; and
performing control such that, during the predetermined operation for switching from the first screen to the second screen, the first screen and the second screen are displayed while being superimposed without continuously changing the size of the display item in accordance with the predetermined operation, and upon completion of the predetermined operation, the second screen is displayed without the first screen and the second screen being superimposed.

\* \* \* \* \*